United States Patent [19]

Woodings

[11] Patent Number: 4,486,249

[45] Date of Patent: Dec. 4, 1984

[54] METHOD OF MAKING CLASS D SUCKER RODS

[76] Inventor: Robert T. Woodings, 134 South Dr., Fox Chapel Borough, Pa. 15238

[21] Appl. No.: 458,061

[22] Filed: Jan. 14, 1983

Related U.S. Application Data

[63] Continuation of Ser. No. 396,702, Jul. 9, 1982.

[51] Int. Cl.³ .............................................. C21D 1/10
[52] U.S. Cl. .................................. 148/154; 148/150; 148/12 B
[58] Field of Search ...................... 148/154, 12 B, 150

[56] References Cited

U.S. PATENT DOCUMENTS

| | | | |
|---|---|---|---|
| 1,171,832 | 2/1916 | Bishop | 148/154 |
| 1,412,484 | 4/1922 | Mordey | 148/154 |
| 2,401,899 | 6/1946 | Bierwirth | 148/154 |
| 3,178,324 | 4/1965 | Grange et al. | 148/154 |
| 3,254,991 | 6/1966 | Shimmin, Jr. et al. | 75/128 |
| 3,271,206 | 9/1966 | Goda et al. | 148/154 |
| 3,489,620 | 1/1970 | Current | 148/146 |
| 3,547,715 | 12/1970 | Rossander | 148/154 |

*Primary Examiner*—L. Dewayne Rutledge
*Assistant Examiner*—Debbie Yee
*Attorney, Agent, or Firm*—John W. Linkhauer

[57] ABSTRACT

It has been found that API Class D sucker rods can be made inexpensively from low-alloy, low-cost steel by following a suitable induction-normalizing process and using a suitable steel to which there has been added 0.07 to 0.15 percent of vanadium.

10 Claims, 1 Drawing Figure

About 25 Feet

C  0.34–0.44%
Mn 1.35–1.65%
P  Up to 0.04%
S  Up to 0.05%
Si 0.15–0.30%
V  0.07–0.15%
Fe Balance

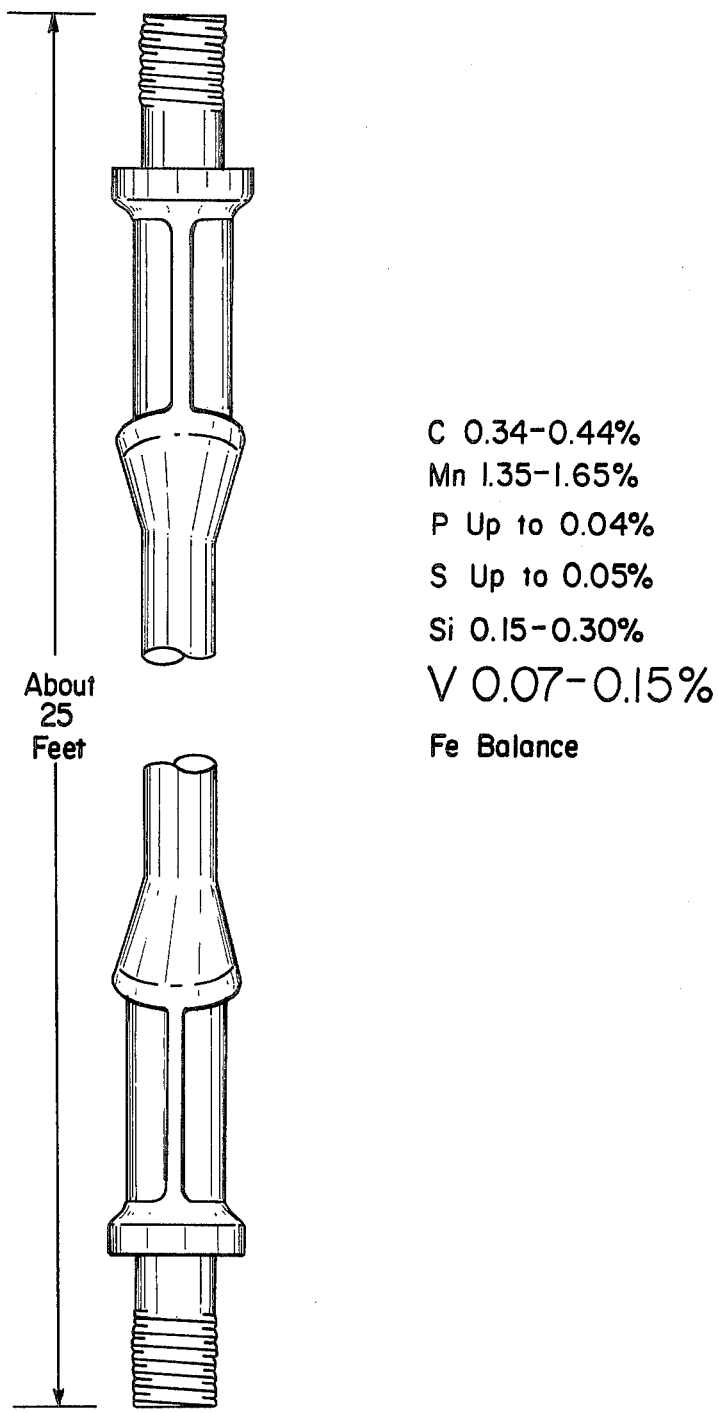

METHOD OF MAKING CLASS D SUCKER RODS

CROSS REFERENCE TO RELATED APPLICATIONS

This is a division of my co-pending application Ser. No. 396,702, filed July 9, 1982.

This application is related to the subject matter of my co-pending application Ser. No. 306,885, filed Sept. 30, 1981.

BACKGROUND OF THE INVENTION

1. Field of the Invention

This invention relates to the manufacture of high-strength sucker rods, and in particular, to the manufacture of such rods in a desirable manner from a relatively inexpensive low-alloy steel.

2. Description of the Prior Art

Many patents relate to the manufacture of sucker rods for use in the oil industry. As is explained in U.S. Pat. No. 3,489,620, in the oil well pumping art, "sucker rods" are rods which extend down a well for transmitting reciprocating motion from a pump at the surface to a subsurface pump near the bottom. The individual rods are connected end to end by internally threaded couplings, which engage externally threaded hinges at the ends of the rods above and below. A sucker-rod string is subjected to cyclic loads as it moves up and down, and such loads often lead to fatigue failure. Corrosive attack by fluids in the well, or abrasion of the rods against the well tubing, may hasten such failure.

As known from the above-mentioned patent, such sucker rods are usually made of steel which has an analysis as indicated below:

Carbon 0.15 to 0.50 percent
Manganese 0.30 to 1.75 percent
Phosphorus 0 to 0.07 percent
Sulphur 0 to 0.35 percent
Silicon 0.10 to 0.35 percent
Nickel 0 to 3.50 percent
Chromium 0 to 1.25 percent
Molybdenum 0 to 0.30 percent
Boron 0 to 0.005 percent
Vanadium 0 to 0.05 percent
Aluminum 0 to 0.05 percent
Balance iron and incidental impurities.

Usually, a sucker rod intended for use with light to medium loads is made essentially of a low-carbon steel which contains, for example, 0.4 percent carbon, 1.5 percent manganese, 0.2 percent silicon, up to 0.03 percent each of phosphorus and sulphur, and the balance iron. With such a plain steel, it is possible to make sucker rods which will perform satisfactorily when subjected to light or medium loads, but it has never hitherto been possible to make a sucker-rod product which will meet the more stringent requirements of API Class D, high-tensile-strength rod for heavy loads. Class D rods must have an ultimate tensile strength of 115,000 to 140,000 pounds per square inch. Before the present invention, sucker rods of such relatively high strength were obtained usually by the use of relatively expensive steels, such as alloy steels of the 4100 series or the 4600 series, or other special steel. In another way of getting the same strength, AISI Type 1536 steel, quenched and tempered, is used. This is a two-step heat-treatment process and is more costly to practice than the present invention.

As is known to those skilled in the art (see the discussion of sucker-rod body features in the article concerning sucker-rod failure printed in the Apr. 9, 1973, edition of the Oil and Gas Journal), some failures are caused by hard pulling, for example, when there is a stuck subsurface pump. Other things being equal, a sucker rod of greater strength is to be preferred over a weaker one, because with a stronger rod, such failures may sometimes be avoided.

The usual procedure known in the prior art for converting rods of steel, as made by the steel manufacturer, into sucker rods, ready for shipment, has involved the following steps:

1. The as-received rods are straightened.
2. The straightened rods are passed into a gas-fired furnace which heats one end.
3. That end of the rod is upset-forged.
4. The other end of the rod is passed into a gas-fired furnace to be heated to a forging temperature.
5. The opposite end of the rod is upset-forged.
6. The entire rod is passed through a gas-fired furnace to heat it to about 1600 to 1650 degrees Fahrenheit, i.e., a normalizing temperature.
7. The rod so heated is permitted to cool in air to about 250 degrees Fahrenheit while being so supported and rotated as to prevent warpage.
8. The normalized rod is shot-blasted.
9. Threads are machined onto the pins at the ends of the rods.
10. Protectors are screwed over the threads.
11. The whole assembly of protectors plus rod is immersed in oil, pitch or the like, and then drained.
12. The rods are bundled and shipped.

It will be observed that in this procedure, no use is made of induction heating. This is and has been the usual practice in the industry, going back to the time that sucker rods were invented.

The practice explained above has been applied to steel rods of various composition, and it is the practice that those of ordinary skill in the art would, in all probability, expect to use in order to make the sucker rod in the fully normalized condition, starting with a rod of any suitable given steel composition.

It is known, moreover, that such a practice has been applied to a steel consisting essentially of 0.30 to 0.37 percent carbon, 1.20 to 1.50 percent manganese, 0.04 percent max. phosphorus, 0.05 percent max. sulphur, 0.15 to 0.30 percent silicon, and the balance iron except for impurities in small amounts which do not affect the properties. The steel composition specified above is that of AISI C 1536 steel. It is well known that when steel of that composition is subjected to the procedure indicated above, there are obtained sucker rods which have the following corresponding mechanical properties, viz.:

| Yield Point | 60,000 to 75,000 p.s.i. |
| --- | --- |
| Tensile Strength | 90,000 to 105,000 p.s.i. |
| % Elongation in 8 inches | 18 to 23 |
| % Reduction of Area | 50 to 65 |
| Brinell Hardness | 190 to 205 |
| Izod (ft., lbs.) | 60 to 90 |

These are typical properties for a Class C sucker rod. Such a rod, though in many instances satisfactory for the service to which it is put, does not have a very wide range of applicability, because it is not useful whenever there can be expected adverse conditions in terms of heavy loads.

There is also known a prior-art practice for converting steel rods to sucker rods that are sold in the fully normalized *and tempered* condition. This practice is the same as the twelve-step procedure detailed above, except that after the step 6, there are the additional steps of 6A. The rod, after being heated to an austenitizing temperature, is quenched.

6B. The quenched rod is reheated to a tempering temperature.

It is known that this procedure has been applied to the above-mentioned AISI C 1536 steel, with the result that there are obtained mechanical properties which meet the specifications for Class D sucker rods, i.e., a minimum tensile strength of 115,000 p.s.i. There are two companies that supply the trade with such high-carbon, quenched-and-tempered sucker rods. The main drawback of obtaining the Class D properties (the higher tensile strength) in this way is that the added steps add to the cost of making the rod.

It must be observed, however, that these high-carbon, quenched-and-tempered sucker rods have been, prior to the present invention, the lowest-cost Class D sucker rods made in the sucker-rod industry, because the other known Class D sucker rods are also sold in the normalized-and-tempered condition (which means that the steps 6A and 6B are used) and at the same time the sucker rods are made from alloy steels, which are higher in price to start with than the AISI C 1536 carbon steel.

Thus, there is on the market a Class D carbon-manganese-chromium-molybdenum alloy-steel sucker rod, which is made of steel consisting essentially of 0.39 to 0.46 percent carbon, 0.65 to 1.10 percent manganese, 0.04 percent max. each of sulphur and phosphorus, 0.20 to 0.35 percent silicon, 0.75 to 1.20 percent chromium, 0.15 to 0.25 percent molybdenum, and balance iron except for impurities in small amounts which do not affect the properties. The mechanical properties of sucker rods which are made of such steel in the fully normalized and tempered conditions are as follows:

| | |
|---|---|
| Yield Point | 100,000 to 115,000 p.s.i. |
| Tensile Strength | 120,000 to 140,000 p.s.i. |
| % Elongation in 8 inches | 10 to 15 |
| % Reduction of Area | 50 to 65 |
| Brinell Hardness | 241 to 280 |
| Izod (ft., lbs.) | 45 to 65 |

There is also on the market, sold in the normalized and tempered condition, another Class D alloy-steel sucker rod. This type of sucker rod is made of a special nickel-chromium-molybdenum alloy steel. The composition and properties are as indicated below:

| | Percent |
|---|---|
| Composition | |
| Carbon | 0.22 to 0.29 |
| Manganese | 0.70 to 1.00 |
| Phosphorus | 0.04 max. |
| Sulfur | 0.04 max. |
| Silicon | 0.20 to 0.35 |
| Nickel | 1.25 to 1.75 |
| Chromium | 0.60 to 0.90 |
| Molybdenum | 0.20 to 0.30 |
| Copper | 0.40 to 0.70 |
| Iron | Balance except for impurities in small amounts that do not affect the properties |

| -continued | |
|---|---|
| | Percent |
| Properties | |
| Yield Point | 90,000 p.s.i., min. |
| Tensile Strength | 115,000 p.s.i., min. |
| % Elongation in 8 inches | 10 to 15 |
| % Reduction of Area | 50 to 60 |
| Brinell Hardness | 227 min. |
| Izod (ft., lbs.) | 65 to 95 |

As indicated above, both of these types of alloy-steel sucker rods cost considerably more to produce than a carbon-steel quenched-and-tempered sucker rod; the as-normalized rods made according to the present invention are even less costly to produce than the above-mentioned quenched-and-tempered Class D sucker rods.

Also belonging to the prior art are certain methods of making case-hardened sucker rods that are made in accordance with the procedure indicated in U.S. Pat. No. 3,489,620. The main idea of that patent is that there is to be made a stronger sucker rod by adopting a practice which serves to achieve a rod whose middle, the part apart form the pins, has been "induction-hardened."

In one practice indicated in the above-mentioned patent, the twelve-step procedure discussed above is modified as follows:

First, there are used in place of Step 6 the above-mentioned Steps 6A and 6B. The above-mentioned quench (Step 6A) can evidently be a quenching either in air or in liquid.

Second, there is mentioned a straightening Step, which is apparently inserted between Steps 7 and 8.

Third, there is yet another set of steps inserted into the process between the above-mentioned Steps 9 and 10. There are the Steps:

9A. The body of the sucker rod is heated by electric induction.

9B. The rod is quenched to produce a martensitic case.

9C. The martensitic case is compressed, preferably by shot-peening.

This amounts to a 17-step procedure. The heating by electric induction which is practiced in accordance with this procedure is one that is limited strictly to that portion of the sucker-rod body which it is intended to strengthen by case-hardening, and the procedure necessarily involves practicing a quenching which immediately follows the induction heating of the selected part of the sucker-rod body apart from the pins.

The above-mentioned patent also indicates an alternative procedure. This follows the twelve-step procedure detailed above through Steps 1 to 5, inclusive. In place of Step 5, there is a Step 6a—the as-forged rod is water-quenched—and a Step 7a—the whole rod is heated by induction, applying "sufficient heat to temper the rod." This alternative procedure continues with Steps 7b—Only the body portion, apart from the pins, of the sucker rod is selectively quenched to develop therein a martensitic case, while at the same time the ends are permitted to cool more slowly, whereby they develop not a martensitic case but a "soft skin," and Step 7c, the soft skin is removed from the ends. This procedure then continues with Steps 8 to 12, as mentioned above.

There is some question whether such a procedure is desirable or feasible. It is not entirely clear, but the recited procedure implies that the rod was not end-heated before forging, as in the above-mentioned twelve-step procedure, but instead heated to a forging temperature throughout its length, and then forged at its ends. So far as is known to the applicant, automatic equipment for performing the operation of forging the ends has not yet been developed and commercially used in the sucker-rod industry. Manual forging of a rod which is red hot throughout its length is obviously an operation which it would be desirable to avoid or eliminate.

The patentee teaches the use of practices as detailed above upon steel compositions which are defined sufficiently broadly to cover every grade of steel, whether carbon steel or alloy steel, known to those in the trade as being commercially used for making sucker rods. Because of the breadth of the ranges, they cover as well a number of other steels, ones that have never actually been made or used but ones that could reasonably be expected to have a similar performance. The recited ranges do not, however, cover steels which contain over 0.05 percent of vanadium, i.e., steels claimed in accordance with the present invention. Again, as a way of obtaining a high-strength sucker rod, the case-hardening method of U.S. Pat. No. 3,489,620 is considerably more costly than that according to the applicant's present invention.

The practices indicated above (the 12-step prior-art procedure for making normalized sucker rods, the 14-step prior-art procedure for making normalized and tempered sucker rods, the 17-step procedure for making case-hardened sucker rods according to the first method taught in U.S. Pat. No. 3,489,620, and the 14-step procedure according to the second or alternative method taught in U.S. Pat. No. 3,489,620), are each less advantageous than the overall approach which the applicant has discovered and which forms the subject of a separate, co-pending application for patent, but which must be explained here in the interest of aiding a proper understanding of the invention in its narrower and more preferable aspects.

The applicant prefers to use a practice which makes an as-normalized (but not tempered) sucker rod, and does so with reliance upon electric-induction heating to the exclusion of the use of gas-fired furnaces, all at a considerable savings in capital investment, needed maintenance, and operating expense. The applicant's preferred practice may be outlined as comprising the following steps:

A. The as-received rods are straightened.

B. The straightened rods are passed into induction-heating apparatus which brings one end of a rod to a forging temperature and holds it at such temperature until an operator is ready to receive it.

C. That end of the rod is upset-forged.

D. The other end of the rod is induction-heated as in Step B.

E. The other end of the rod is upset-forged.

F. The entire rod is passed through an electric induction furnace to heat it to about 1650 degrees Fahrenheit, i.e., a normalizing temperature.

G. The rod so heated is permitted to cool in air to about 250 degrees Fahrenheit while being so supported and rotated as to prevent warpage.

H. The normalized rod is shot-blasted.

I. Threads are machined onto the pins at the ends of the rods.

J. Protectors are screwed over the threads.

K. The whole assembly of protectors plus rod is immersed in a suitable corrosion-inhibiting substance and then drained.

L. The rods are bundled and shipped.

The steps B and D are preferably done with the use of rod-handling and end-heating equipment which is described and claimed in the applicant's co-pending application Ser. No. 372,965, filed Apr. 29, 1982.

The step F is preferably performed with the use of specific heating frequencies, amounts of power and throughput rates as indicated in the applicant's co-pending application Ser. No. 306,885, filed Sept. 30, 1981.

The step G is preferably performed with the use of normalizer-unloader equipment as taught and claimed in the applicant's co-pending application Ser. No. 371,582, filed Apr. 26, 1982.

It has not been evident to those of ordinary skill in the art that it would be possible, by using a 12-step procedure as explained above to process, for example, steel rods of AISI Type 1536 steel, to obtain remarkable benefits in terms of capital investment, needed maintenance, and operating expense. A demonstration of the practicality of such a procedure with one grade of steel, e.g., AISI Type 1536, does suggest to a person of ordinary skill in the art that for the production of sucker rods in the as-normalized condition, steel rods of at least any of the compositions specified in the broad ranges of U.S. Pat. No. 3,489,620 could be so processed, with the result that there could be expected to be obtained at low cost a product as-normalized sucker rod having whatever strength characteristics could be expected from the use, to make sucker rods, of such steel in its as-normalized condition. If one considers the applicant's method of making sucker rods with reliance upon electric-induction heating in place of gas-fired heating as constituting a first invention, the further improvement which may be obtained by using with such first invention rods of a carbon steel which contains 0.07 to 0.15 percent, preferably 0.07 to 0.10 percent of vanadium, to obtain an as-normalized sucker rod of unexpectedly high strength and other suitable characteristics, constitutes a separate and distinct invention, one which is not made obvious by the prior art known to the applicant and discussed above.

SUMMARY OF THE INVENTION

It has been found that API Class D sucker rods can be made inexpensively from low-alloy, low-cost steel by following a suitable induction-normalizing process and using a suitable steel to which there has been added 0.07 to 0.15 percent of vanadium.

DESCRIPTION OF THE DRAWING

The sole FIGURE is a representation of a sucker rod made according to the present invention.

DESCRIPTION OF THE PREFERRED EMBODIMENTS

Sucker rods processed in accordance with the invention preferably have a metallurgical composition following within the broad and preferred ranges given below in Table 1.

TABLE 1

|  | Broad Range Percent | Preferred Range Percent |
|---|---|---|
| Carbon | 0.34 to 0.44 | 0.36 to 0.44 |
| Manganese | 1.35 to 1.65 | 1.35 to 1.65 |

TABLE 1-continued

|  | Broad Range Percent | Preferred Range Percent |
|---|---|---|
| Phosphorus | up to 0.04 | up to 0.03 |
| Sulphur | up to 0.05 | up to 0.03 |
| Silicon | 0.15 to 0.30 | 0.18 to 0.27 |
| Vanadium | 0.07 to 0.15 | 0.07 to 0.10 |
| Iron | Balance except for incidental impurities | |

In processing the rods, they are initially passed through a straightener. Their ends are then heated, preferably in an induction heater to a temperature of about 2250 degrees Fahrenheit. Following heating of ends of the rods to forging temperature, the rods are then forged or upset to form the usual wrench-square and pin portions. Following forging and cooling, rods are then passed through induction normalizing coils, there being three coils in the preferred embodiment of the invention which operate at a frequency of 7,000 to 10,000 hertz, and preferably 9,600 hertz, so as to be below the radio-frequency range. The total power to the three coils, in a typical installation, is on the order of 500 to 1000 kilowatts. Each coil, in a typical installation, is about three feet long, or less. In passing through the coils, the rods are heated up, two rods at a time, to a temperature of 1650 Fahrenheit. In-line rollers support the rods between successive coils. The rods, typically 25 feet long and ½ to 1⅛ inches in diameter, pass through the induction-normalizing coils at a suitable rate of speed such as 20 to 25 feet per minute, depending on size. After passing through the normalizing coils, the rods are deposited on a cooling table.

A better appreciation of the invention may be obtained from a consideration of the data presented below in Tables II to V. Tables II and IV present certain steel compositions, and Tables III and V show the physical properties determined from samples of steel of the compositions specified in Tables II and IV, respectively. A point of distinction between the results in Tables III and those in Table V is that the former were obtained with rods ⅜ inch in diameter, whereas the latter were obtained with rods ⅝ inch in diameter.

TABLE II

| Steel | C | Mn | P | S | Si | V |
|---|---|---|---|---|---|---|
| 1 | 0.41 | 1.50 | 0.015 | 0.023 | 0.22 | 0.043 |
| 2 | 0.41 | 1.47 | 0.010 | 0.018 | 0.20 | 0.011 |
| 3 | 0.40 | 1.44 | 0.014 | 0.012 | 0.22 | 0.116 |
| 4 | 0.40 | 1.50 | 0.009 | 0.014 | 0.24 | 0.120 |
| 5 | 0.41 | 1.57 | 0.008 | 0.014 | 0.22 | 0.130 |
| 6 | 0.40 | 1.4 | 0.010 | 0.010 | 0.20 | N.A. |

In the above Table and in Table IV, "N.A." means "none added." The steel "6" is not based upon any specific heat of steel, but it is typical for AISI Type 1536 steel as mentioned above. In such a steel, the vanadium content may be taken as being very low, on the order of 0.01 percent or less.

TABLE III

| Steel | Yield Point, p.s.i. | Elong. in 8 in., % | Tensile Str., p.s.i. | BHN |
|---|---|---|---|---|
| 1 | 86,170 | 17 | 122,000 | 235 |
| 2 | 96,900 | 14 | 136,450 | 269 |
| 3 | 95,760 | 10 | 137,600 | 277 |
| 4 | 96,400 | 10 | 139,500 | 285 |
| 5 | 93,560 | 9 | 141,000 | 285 |
| 6 | 70,000 | 20 | 104,000 | 200 |

TABLE IV

| Steel | C | Mn | P | S | Si | V |
|---|---|---|---|---|---|---|
| 6 | 0.40 | 1.40 | 0.010 | 0.010 | 0.20 | N.A. |
| 7 | 0.41 | 1.50 | 0.015 | 0.023 | 0.22 | 0.043 |
| 8 | 0.41 | 1.50 | 0.015 | 0.023 | 0.22 | 0.043 |
| 9 | 0.35 | 1.32 | 0.021 | 0.035 | 0.24 | 0.055 |
| 10 | 0.34 | 1.40 | 0.019 | 0.039 | 0.25 | 0.055 |
| 11 | 0.36 | 1.61 | 0.020 | 0.020 | 0.18 | 0.087 |
| 12 | 0.39 | 1.60 | 0.017 | 0.025 | 0.25 | 0.087 |
| 13 | 0.40 | 1.45 | 0.020 | 0.019 | 0.25 | 0.092 |
| 14 | 0.44 | 1.40 | 0.016 | 0.013 | 0.27 | 0.094 |
| 15 | 0.39 | 1.62 | 0.019 | 0.016 | 0.18 | 0.100 |
| 16 | 0.38 | 1.63 | 0.025 | 0.012 | 0.22 | 0.100 |
| 17 | 0.41 | 1.47 | 0.010 | 0.018 | 0.20 | 0.11 |
| 18 | 0.42 | 1.48 | 0.009 | 0.013 | 0.22 | 0.12 |
| 19 | 0.41 | 1.57 | 0.008 | 0.014 | 0.22 | 0.13 |
| 20 | 0.41 | 1.57 | 0.008 | 0.014 | 0.22 | 0.13 |
| 21 | 0.39 | 1.56 | 0.022 | 0.016 | 0.23 | 0.074 |

TABLE V

| Steel | Yield Point, p.s.i. | Elong. in 8 in., % | Tensile Str., p.s.i. | BHN |
|---|---|---|---|---|
| 6 | 70,000 | 20 | 104,000 | 200 |
| 7 | 86,100 | 16.5 | 122,000 | 235 |
| 8 | 87,100 | 17 | 122,200 | 235 |
| 9 | 86,500 | N.D. | 121,000 | N.D. |
| 10 | 89,500 | N.D. | 122,500 | N.D. |
| 11 | 99,300 | 15.5 | 126,500 | 241 |
| 12 | 99,600 | 16 | 126,700 | 245 |
| 13 | 100,300 | 14.5 | 126,700 | 250 |
| 14 | 98,100 | 12.5 | 130,000 | 255 |
| 15 | 100,000 | 15.5 | 126,000 | 252 |
| 16 | 98,100 | 12.5 | 130,000 | 255 |
| 17 | 88,400 | 14 | 128,600 | 262 |
| 18 | 90,000 | 14.5 | 128,300 | 262 |
| 19 | 91,600 | 9 | 129,900 | 277 |
| 20 | 86,600 | 9 | 124,800 | 277 |
| 21 | 101,109 | 16.2 | 123,940 | 248 |

The foregoing data reveal that a tensile strength in the range of API Class D sucker rods (ultimate tensile strength of 115,000 to 140,000 pounds per square inch) can be obtained by using a steel with as little as 0.043 percent of vanadium, instead of one with no vanadium added. To obtain, however, values of tensile strength and yield strength which more closely approximate those of the API Class D rods now on the market (YP 100,000 to 115,000 p.s.i.; UTS 120,000 to 140,000 p.s.i.; BHN 241 to 280), it is essential to add at least 0.07 weight percent of vanadium, and thus the lower limit of vanadium content claimed herein is set at that value, and the lesser improvements which are obtainable with the use of 0.06 percent of vanadium or less are not claimed herein and are dedicated to the public. At the other end of the range of vanadium content, the use of more than 0.15 percent of vanadium is undesirable because of cost and brittleness considerations, and as can be seen by a comparison of steels 2 to 5 and 17 to 20 with steels 11 to 16, the use of more than 0.10 percent of vanadium is accompanied by enough of a decrease in strength together with an increase of hardness and brittleness (BHN values over 260) that such higher vanadium steels are less desirable than steels having a vanadium content which is precisely within the preferred range, i.e., 0.07 to 0.10 percent of vanadium. It is to be emphasized that the values recited in Tables III and V refer to steels in the as-normalized condition, and not the normalized-and-tempered condition. This means that sucker rods of the desired high strength may be obtained either with the use of merely the prior-art twelve-step procedure indicated above or with the use of the applicant's similar twelve-step method based upon use of electric-induction heating, preferably the latter.

In the development of the instant invention, an effort was made to obtain similar results by adding equivalent amounts of a different carbide-forming element, namely, niobium, but successful results were not obtained.

Although the invention has been described in connection with a certain specific embodiment, it will be readily apparent to those skilled in the art that various changes can be made to suit requirements without departing from the spirit and scope of the invention.

I claim as my invention:

1. The process of manufacturing a high-strength sucker rod from a carbon steel which comprises heating to a normalizing temperature by means of electric induction an elongated rod of steel suited for the manufacture of a sucker rod, said steel consisting essentially of about:
   0.34 to 0.44 percent carbon,
   1.35 to 1.65 percent manganese,
   up to 0.04 percent phosphorus,
   up to 0.05 percent sulphur,
   0.15 to 0.30 percent silicon,
   0.07 to 0.15 percent vanadium,
   balance iron and incidental impurities,
and then permitting said rod to cool in air while so supporting and rotating said rod as to prevent warping.

2. A process as defined in claim 1, characterized in that there is thereby produced a sucker rod having an ultimate tensile strength in the range of 115,000 to 140,000 pounds per square inch.

3. The process of manufacturing a high strength sucker rod from a carbon steel which comprises heating to a normalizing temperature by means of electrical induction an elongated rod as defined in claim 1, said rod having a length of approximately 25 feet and a diameter of approximately $\frac{1}{2}$ to $1\frac{1}{8}$ inches, and then permitting said rod to cool in air while so supporting and rotating said rod as to prevent warping.

4. A process as defined in claim 3, characterized in that there is thereby produced a sucker rod having an ultimate tensile strength in the range of 115,000 to 140,000 pounds per square inch.

5. The process of manufacturing a high-strength sucker rod as defined in claim 1, wherein said steel contains
   up to 0.03 percent phosphorus,
   up to 0.03 percent sulphur, and
   0.07 to 0.10 percent vanadium.

6. A process as defined in claim 5, characterized in that there is thereby produced a sucker rod having an ultimate tensile strength in the range of 115,000 to 140,000 pounds per square inch.

7. A process as defined in claim 5, characterized in that said rod has a length of approximately 25 feet and a diameter of approximately $\frac{1}{2}$ to $1\frac{1}{8}$ inches.

8. A process as defined in claim 7, characterized in that there is thereby produced a sucker rod having an ultimate tensile strength in the range of 115,000 to 140,000 pounds per square inch.

9. In a method for making high-strength oil well sucker rods, the steps of passing a rod through an induction coil assembly operating at a frequency of 7,000 to 10,000 hertz and thereafter air-cooling said rods, said sucker rods being made of steel consisting essentially of:
   up to 0.04 percent phosphorus,
   up to 0.05 percent sulphur,
   0.34 to 0.44 percent carbon,
   1.35 to 1.65 percent manganese,
   0.15 to 0.30 percent silicon,
   0.07 to 0.15 percent vanadium,
   balance iron and incidental impurities.

10. The invention of claim 9, wherein said steel contains up to 0.03 percent each of phosphorus and sulphur and 0.07 to 0.10 percent of vanadium.

* * * * *